United States Patent
Lee

(10) Patent No.: US 11,028,255 B2
(45) Date of Patent: Jun. 8, 2021

(54) COMPOSITION FOR TIRE TREAD COMPRISING RESIN ALTERNATIVE TO PROCESS OIL

(71) Applicant: KOLON INDUSTRIES, INC., Seoul (KR)

(72) Inventor: Young-Deuck Lee, Yongin-si (KR)

(*) Notice: Subject to any disclaimer, the term of this patent is extended or adjusted under 35 U.S.C. 154(b) by 62 days.

(21) Appl. No.: 16/097,389

(22) PCT Filed: Sep. 29, 2017

(86) PCT No.: PCT/KR2017/010923
§ 371 (c)(1),
(2) Date: Oct. 29, 2018

(87) PCT Pub. No.: WO2018/062933
PCT Pub. Date: Apr. 5, 2018

(65) Prior Publication Data
US 2019/0144643 A1    May 16, 2019

(30) Foreign Application Priority Data
Sep. 30, 2016 (KR) .................. 10-2016-0126751

(51) Int. Cl.
*C08L 9/06* (2006.01)
*B60C 1/00* (2006.01)
*C08L 61/14* (2006.01)
*C08L 101/00* (2006.01)
*C08K 3/06* (2006.01)
*C08K 3/36* (2006.01)
*C08K 3/22* (2006.01)
*C08K 5/09* (2006.01)
*C08K 3/04* (2006.01)
*C08L 21/00* (2006.01)
*C08K 5/00* (2006.01)

(52) U.S. Cl.
CPC ............ *C08L 9/06* (2013.01); *B60C 1/00* (2013.01); *B60C 1/0016* (2013.01); *C08K 3/04* (2013.01); *C08K 3/06* (2013.01); *C08K 3/22* (2013.01); *C08K 3/36* (2013.01); *C08K 5/00* (2013.01); *C08K 5/09* (2013.01); *C08L 21/00* (2013.01); *C08L 61/14* (2013.01); *C08L 101/00* (2013.01); *C08L 2205/025* (2013.01); *C08L 2205/035* (2013.01); *C08L 2205/08* (2013.01); *Y02T 10/86* (2013.01)

(58) Field of Classification Search
CPC ..................... C08L 9/06; B60C 1/00
USPC ........................................ 524/322
See application file for complete search history.

(56) References Cited

U.S. PATENT DOCUMENTS

| | | | |
|---|---|---|---|
| 6,186,204 B1 | 2/2001 | Sasaka et al. | |
| 8,178,605 B2 | 5/2012 | Lopitaux et al. | |
| 8,637,606 B2 | 1/2014 | Pille-Wolf et al. | |
| 9,441,098 B1* | 9/2016 | Isitman | C08L 9/00 |
| 2004/0092648 A1* | 5/2004 | Jones | C08K 5/01 |
| | | | 524/502 |
| 2004/0242731 A1* | 12/2004 | Waddell | C08F 8/20 |
| | | | 524/47 |
| 2006/0004138 A1 | 1/2006 | Mathieu et al. | |
| 2007/0037908 A1* | 2/2007 | Pille-Wolf | B60C 1/0016 |
| | | | 524/270 |
| 2008/0021149 A1 | 1/2008 | Jones et al. | |
| 2010/0113703 A1 | 5/2010 | Houjo et al. | |
| 2010/0317800 A1 | 12/2010 | Pille-Wolf et al. | |
| 2013/0203890 A1 | 8/2013 | Lopitaux et al. | |
| 2016/0009846 A1 | 1/2016 | Sato et al. | |
| 2017/0210881 A1* | 7/2017 | Miyazaki | B60C 1/00 |

FOREIGN PATENT DOCUMENTS

| | | | | |
|---|---|---|---|---|
| JP | 11-269308 A | 10/1999 | | |
| JP | 2008-169296 A | 7/2008 | | |
| JP | 2015-227423 A | 12/2015 | | |
| KR | 10-2001-0106737 A | 12/2001 | | |
| KR | 10-0626140 B1 | 9/2006 | | |
| KR | 10-2013-0020672 A | 2/2013 | | |
| KR | 20130020672 A * | 2/2013 | | C08L 9/06 |
| KR | 10-2013-0075243 A | 7/2013 | | |
| KR | 10-2014-0092450 A | 7/2014 | | |
| KR | 10-2015-0024701 A | 3/2015 | | |
| KR | 10-1504995 B1 | 3/2015 | | |
| KR | 10-2010-0053180 A | 5/2020 | | |
| WO | WO 2016/031460 | * | 3/2016 | |
| WO | WO2016/043851 | * | 3/2016 | |
| WO | WO2016/106416 | * | 6/2016 | |
| WO | 2017-001616 A1 | 1/2017 | | |

OTHER PUBLICATIONS

Mitsui Chemicals America, High Performance Aromatic Hydrocarbon Resin, Retrieved from https://www.mitsuichemicals.com/ftr.htm.

* cited by examiner

*Primary Examiner* — Deve V Hall

(57) ABSTRACT

The present invention relates to a composition for a tire tread, comprising a resin alternative to a process oil. The composition for a tire tread, according to the present invention, can satisfy basic physical properties required as a tire, such as tensile strength, wear resistance, durability, and hardness, and improve the gripping force without a big increase in rolling resistance. A tire manufactured from the composition has the improved gripping force, particularly on wet road surfaces, and thus may be used for manufacturing a high-performance tire with excellent breakability, thereby being capable of increasing product competitiveness.

9 Claims, No Drawings

COMPOSITION FOR TIRE TREAD COMPRISING RESIN ALTERNATIVE TO PROCESS OIL

TECHNICAL FIELD

This application claims the benefit of priority based on Korean Patent Application No. 10-2016-0126751, filed on Sep. 30, 2016, the entire contents of which are incorporated herein by reference.

The present invention relates to a composition for a tire tread, comprising a resin alternative to a process oil.

BACKGROUND ART

Recently, as the power performance of a vehicle is improved, studies on the improvement of the performance of the tire are being actively carried out. The tire is the only part of the vehicle which is in contact with the ground and is an important component that has a great influence on the transmission of power, change of direction, fuel efficiency and traction performance of the vehicle. In addition, the performance of the tire is directly related to the performance of the vehicle, and the tire is an expensive component and is one of the security components that can be connected to a mortality event in the event of a problem associated with it.

The raw materials used for tire vary widely, and a tire with a shape is made by evenly mixing and reacting these raw materials. The raw materials of the tire may be classified into very various kinds, such as natural rubbers, synthetic rubbers, carbon black, silica, process oils, antiaging agent, activators, accelerators, vulcanizing agents, dispersants, viscosity reducers, retarders, inorganic fillers, adhesives, tackifiers, steel cords, and fabric cords. These raw materials are reacted in a high temperature mold under various conditions such as constant amount, mixing time, injection order, mixing temperature, mixer speed, etc. and under optimum dispersion condition to manufacture a tire.

The typical performance of the tire is fuel efficiency, traction, and wear resistance. Since each performance is balanced with each other, a trade-off phenomenon generally appears, which means that if one characteristic is improved, the other characteristics are deteriorated. The tire is composed of several components, each of which is harmonized to cause the performance of the tire to appear. Among them, the tire tread, which is the part that comes into contact with the ground, is a component that has the greatest influence on tire wear and traction performance. The composition of such tread consists of rubber, filler and vulcanizing agent and its performance can be adjusted by changing the mixing process.

In order to get the necessary properties, various kinds of additives are used in the tire. A process oil is used as one of the additives to improve the mixing load when mixing the rubber and the various additives and the like. Specifically, the process oil is used as a softening agent when mixing the raw materials of the tire in order to reduce the loss of mixing energy needed to mix the components of the tire rubber composition and to improve the dispersion and compatibility between one rubber and other rubber, between the rubber and the chemical and the filler and between the rubber and the filler, which are various materials used in rubber composition. The process oil used in the rubber composition for the tire is generally a hydrocarbon compound, which is a viscous oil composed of an aromatic-based component, a paraffin-based component and a naphthene-based component. In general, the aromatic-based component contained in the process oil has the highest compatibility with rubber, but it has a problem of being harmful to the environment. Therefore, various studies have been carried out to replace this process oil.

In addition, the more the process oil is added, the more tires are softened and the greater the rolling resistance becomes, which affect the fuel efficiency of the vehicle. Therefore, there is an urgent need for research on substitutes that can replace the process oil.

PRIOR ART DOCUMENTS

Patent Documents

Korean Patent Publication No. 2001-0106737 (Dec. 7, 2001), A rubber composition for racing tire tread, Korean Patent Publication No. 2013-0075243 (Jul. 5, 2013), TREAD RUBBER COMPOSITION AND TIRE MANUFACTURED BY USING THE SAME, Korean Patent Publication No. 2010-0053180 (May 20, 2010), RUBBER COMPOSITION OF TIRE TREAD, Korean Patent No. 10-62614 (Sep. 13, 2006), A composition for tire tread, Korean Patent Publication No. 2014-0092450 (Jul. 24, 2014), Terpene Modified Phenol Resin and Rubber Composition for Tire Tread Comprising the Same, Korean Patent Publication No. 2015-0024701 (Mar. 9, 2015), Rubber Composition for Tread of Tire, U.S. Pat. No. 8,637,606 (Jan. 28, 2014), Tires and tread formed from phenol-aromatic-terpene resin.

DISCLOSURE

Technical Problem

In order to solve the above problems, the inventors of the present invention have noted that while looking for a substitute for the existing process oil, since the conventional resins are in a solid state at room temperature, but are present in a liquid state in a high temperature mixer of 100° C. or higher in which the raw materials of the tire are mixed, the resins can act as a lubricant like the process oil during the mixing of the raw materials of the tire and thus have found that when a specific resin is added at the time of mixing the raw materials of the tire, such a resin may replace the process oil.

In addition, the inventors of the present invention have found that when the specific resin is used, there is also an advantage that the performance of the specific resin can be attributed to the tire, which can be advantageous in many ways.

Therefore, it is an object of the present invention to provide a composition for a tire tread comprising a resin alternative to a process oil.

Technical Solution

In order to achieve the above object, the present invention provides a composition for a tire tread, characterized by comprising at least two resins selected from the group consisting of a methylstyrenated phenol-based resin, a hydrocarbon-based resin, a hydrogenated hydrocarbon-based resin and a terpene phenol resin.

At this time, the composition for the tire tread may not include the process oil.

At this time, the weight-average molecular weight of the methylstyrenated phenol-based resin may be 200 to 5,000 g/mol; the weight-average molecular weight of the hydrocarbon-based resin may be 400 to 5,000 g/mol; the weight-average molecular weight of the hydrogenated hydrocarbon-based resin may be 500 to 5,000 g/mol and its Tg may be 30 to 100° C. and its softening point may be 100 to 150° C.; and the weight-average molecular weight of the terpene phenol resin may be 500 to 5,000 g/mol and its Tg may be 20 to 100° C. and its softening point may be 100 to 150° C.

At this time, the composition for the tire tread may include the methylstyrenated phenol-based resin and the terpene phenol resin.

At this time, the composition for the tire tread may include two types of resins wherein the weight ratio of the first resin to the second resin may be 30-70: 70-30.

At this time, the composition for the tire tread may include two types of resins at a weight ratio of 1 to 10 respectively relative to 100 parts by weight of the raw material rubber.

At this time, the composition for the tire tread may include 1 to 10 parts by weight of each of two types of resins and may include 100 to 160 parts by weight of the raw material rubber, 1 to 3 parts by weight of a homogenizing agent, 1 to 5 parts by weight of zinc oxide, 10 to 40 parts by weight of silica, 1 to 10 parts by weight of a silane coupling agent, 10 to 40 parts by weight of carbon black, 1 to 3 parts by weight of stearic acid, 1 to 3 parts by weight of sulfur and 1 to 5 parts by weight of a curing accelerator.

At this time, the value of Tan δ at 0° C. of the composition for the tire tread may be as high as 10% or more compared to the composition for the tire tread containing the process oil.

At this time, the value of Tan δ at 70° C. of the composition for the tire tread may be as high as 4% or less compared to the composition for the tire tread containing the process oil.

Advantageous Effects

The composition for the tire tread according to the present invention can satisfy the basic physical properties required as a tire, namely tensile strength, wear resistance, durability and hardness, and can improve gripping force without a big increase in rolling resistance. The tire made by the composition has improved gripping force, especially improved gripping force on the wet road surface and thus is used in the manufacture of a high-performance tire with excellent traction property, thereby being capable of increasing product competitiveness Best Mode Hereinafter, the present invention will be described in detail in order that the present invention can be easily carried out by those skilled in the art to which the present invention pertains. The present invention may, however, be embodied in many different forms and should not be construed as limited to the embodiments set forth herein.

The present invention provides a composition for a tire tread, which includes a resin for replacing the existing process oil.

The resin alternative to the process oil may include two or more types of resins selected from the group consisting of a methylstyrenated phenol-based resin, hydrocarbon-based resin, a hydrogenated hydrocarbon-based resin and a terpene phenol resin, and preferably may comprise two types of resins. More preferably, the methylstyrenated phenol-based resin and the terpene phenol resin may be included When manufacturing a tire tread including only one resin among the resins in place of the process oil, as the gripping force on the wet road surface is improved, the rolling resistance is increased and thus the fuel cost can be increased. However, as described above, when the tire tread is manufactured using two or more types of resins, the increase in rolling resistance can be minimized and thus an increase in fuel cost can be prevented while ensuring the superior gripping force of the tire is ensured, The weight-average molecular weight of the methylstyrenated phenol-based resin may be 200 to 5,000 g/mol.

The weight-average molecular weight of the hydrocarbon-based resin may be 400 to 5,000 g/mol.

The weight-average molecular weight of the hydrogenated hydrocarbon-based resin may be 500 to 5,000 g/mol, and its Tg may be 30 to 100° C. and its softening point may be 100 to 150° C.

The weight-average molecular weight of the terpene phenol resin may be 500 to 5,000 g/mol, and its Tg may be 20 to 100° C. and its softening point may be 100 to 150° C.

The composition for the tire tread includes two types of resins, and the weight ratio of the first resin and the second resin may be 30 to 70:70 to 30.

The composition for the tire tread may include two types of resins at a weight ratio of 1 to 10 respectively relative to 100 parts by weight of the raw material rubber.

The composition for the tire tread may include 1 to 10 parts by weight of each of two types of resins and may include 100 to 160 parts by weight of the raw material rubber, 1 to 3 parts by weight of a homogenizing agent, 1 to 5 parts by weight of zinc oxide, 10 to 40 parts by weight of silica, 1 to 10 parts by weight of a silane coupling agent, 10 to 40 parts by weight of carbon black, 1 to 3 parts by weight of stearic acid, 1 to 3 parts by weight of sulfur and 1 to 5 parts by weight of a curing accelerator. The raw material rubber may include 90 to 130 parts by weight of a styrene butadiene rubber and 10 to 30 parts by weight of a butadiene rubber.

The value of Tan δ at 0° C. of the composition for the tire tread may be as high as 10% or more compared to the composition for the tire tread containing the process oil.

The value of Tan δ at 70° C. of the composition for the tire tread may be as high as 4% or less compared to the composition for the tire tread containing the process oil.

The composition for the tire tread containing the process oil refers to a composition for the tire tread generally containing the process oil without containing the resin of the present invention.

The composition of the tire tread of the present invention may not include the process oil, but the process oil may be added as needed.

Since at least two resins selected from the group consisting of the phenol-based resin, the hydrocarbon-based resin, the hydrogenated hydrocarbon-based resin and the terpene phenol resin act as a lubricant by being transformed into a liquid phase, and thus act as an alternative to the process oil and provide a better effect on the tire tread than when adding the process oil, due to the property of each resin.

The present invention provides the composition for the tire tread which can improve the gripping force (wet grip) of the tire by adding the resins instead of the existing process oil, and at the same time, can reduce the increase in the rolling resistance which is known to be opposite to such property, and thus can satisfy two properties of gripping force and rolling resistance required as a tire.

The gripping force as referred to in the present specification refers to a wet gripping force, and the wet gripping force refers to a gripping force in a road surface state that is wet by snow or rainwater. The fact that the gripping force is excellent means that the adhesion between the tire and the road surface is high and thus the traction property is good at cornering or stopping.

The rolling resistance refers to the ratio of the rolling resistance to the load applied to the tire. In the present invention, the fact that the rolling resistance is excellent means that there is less energy loss in the tire itself or between the tire and the road surface during driving of the vehicle, or the increase in the rolling resistance is small.

The gripping force and the rolling resistance are opposite to each other. As the gripping force is increased, the rolling resistance is also increased and thus the fuel cost is increased. As described above, the composition for the tire tread including the resins alternative to the process oil, as proposed in the present invention, minimizes the reduction of fuel efficiency by minimizing the increase of rolling resistance while ensuring the traction performance by increasing the gripping force.

The rubber composition used in the tire tread includes a raw material rubber, a reinforcing agent, a silane coupling agent, a homogenizing agent, a vulcanizing agent, a curing accelerator and the like, and at this time, silica is used to increase the rolling resistance with carbon black as the reinforcing agent. In addition, a silane coupling agent is used to increase the gripping force. At this time, silica and the silane coupling agent must be mixed uniformly in order to increase the rolling resistance and the gripping force.

Hereinafter, the composition of the tire tread rubber composition together with the resins will be described in detail.

The raw material rubber is not particularly limited as long as it has an olefinic double bond (carbon-carbon double bond), and may be a natural rubber, a synthetic rubber, or a mixture thereof. For example, the raw material rubber is preferably at least one selected from the group consisting of natural rubber, butadiene rubber, nitrile rubber, silicone rubber, isoprene rubber, styrene-butadiene rubber (SBR), isoprene-butadiene rubber, styrene-isoprene-butadiene rubber, acrylonitrile-butadiene rubber (NBR), ethylene-propylene-diene rubber, halogenated butyl rubber, halogenated isoprene rubber, halogenated isobutylene copolymer, chloroprene rubber, butyl rubber and halogenated isobutylene-p-methylstyrene rubber. More preferably, the butadiene rubber and butadiene rubber may be used.

The reinforcing agent may be carbon black and silica.

The carbon black produces the effect of improving the wear resistance, improving the rolling resistance characteristic, preventing cracks and cracks due to ultraviolet (preventing the ultraviolet deterioration), and so on. The carbon black which can be used in the present invention is not particularly limited, and any carbon black which is commonly used in the field of tire treads can be used. For example, the carbon black may be a carbon black such as furnace black, acetylene black, thermal black, channel black, graphite and the like. In addition, the physical properties such as the particle diameter, the pore volume, and the specific surface area of the carbon black are not particularly limited, and various carbon blacks such as SAF, ISAF, HAF, FEF, GPF, and SRF (all of which are abbreviations for carbon black classified according to ASTM standard D-1765-82a in the United States) which are used in the conventional rubber industry can be used properly.

The carbon black is preferably contained in an amount of 10 to 40 parts by weight relative to 100 to 160 parts by weight of the raw material rubber. The carbon black is a reinforcing filler and is an essential element for rubber mixing. If the content of carbon black is less than the above range, the effect of the reinforcement is deteriorated. On the contrary, if the content exceeds the above range, it is difficult to disperse it.

In addition, silica is not particularly limited as long as it is used as a reinforcing agent for rubber in the field of tire treads. For example, white carbon obtained by a dry process, white carbon obtained by a wet process, synthetic silicate based white carbon, colloidal silica, and precipitated silica can be used. The specific surface area of silica is not particularly limited, but may usually be in the range of 40 to 600 $m^2/g$, preferably 70 to 300 $m^2/g$ and its primary particle diameter may be between 10 and 1000 nm. These may be used alone or in combination of two or more.

The silica is preferably contained in an amount of 10 to 40 parts by weight relative to 100 to 160 parts by weight of the raw material rubber. If the content of silica is less than the above range, the rolling resistance is high and thus the efficiency of the fuel cost is lowered. On the contrary, if the content exceeds the above range, the gripping force may be lowered. Therefore, the content is appropriately selected within the above range.

The reinforcing agent may include a powder of minerals such as clay or talc, carbonates such as magnesium carbonate and calcium carbonate, alumina hydrate such as aluminum hydroxide, etc. in addition to the above carbon black and silica.

The silane coupling agent is used in order to mix the silica

The silane coupling agent available may be vinyltrichlorosilane, vinyltriethoxysilane, vinyltris(beta-methoxyethoxy)silane, beta-(3,4-epoxycyclohexyl)-ethyltrimethoxysilane, 3-chloropropyltrimethoxysilane, 3-chloropropyltriethoxysilane, 3-mercaptopropyltrimethoxysilane, 3-mercaptopropyltriethoxysilane, bis(3-(triethoxysilyl)propyl)disulfide, bis(3-triethoxysilylpropyl)trisulfide, bis(3-(triethoxysilyl)propyl)tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzoyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide and the like. These may be used alone or in admixture of two or more, and preferably bis(3-(triethoxysilyl)propyl)tetrasulfide is used.

The content of the silane coupling agent varies depending on the content of silica, and is preferably 1 to 10 parts by weight relative to 100 parts by weight of raw material rubber. If the content is less than the above range, it is difficult to uniformly mix the silica, which may result in deterioration of the physical properties of the tire tread. On the contrary, if the content exceeds the above range, gelling of the rubber may occur during the manufacture of the tire tread. Therefore, the content is appropriately selected within the above range.

The curing accelerator may be, for example, thiuram-based accelerator such as tetramethylthiurammonosulfide, tetramethylthiuramdisulfide and tetraethylthiuramdisulfide; thiazol-based accelerator such as N-t-butyl benzothiazol-2-sulfenamide (TBBS), 2-mercaptobenzothiazol, and dibenzothiazyldisulfide; sulfenamide-based accelerator such as N-cyclohexyl-2-benzothiazylsulfenamide, and N-oxydiethylene-2-benzothiazolylsulfenamide; guanidine-based accelerator such as diphenylguanidine (DPG), and diorthotolylguanidine; aldehyde-amine-based accelerator such as n-butylaldehyde-aniline condensate, and butylaldehyde-monobutylamine condensate; aldehyde-ammonia-based accelerator such as hexamethylenetetramine; thiourea-based accelerator such as thiocarbanylide. When these curing accelerators are mixed, one type may be used alone, or two or more types may be used in combination. The curing accelerator may be N-t-butyl benzothiazol-2-sulfenamide and diphenylguanidine.

The content of such curing accelerator may preferably be 1 to 5 parts by weight relative to 100 to 160 parts by weight of raw material rubber in terms of improvement of the physical properties.

In addition, the rubber composition according to the present invention may also contain, as needed, one or at least two selected from the group consisting of the various additives which are used in the rubber industry, for example, an antiaging agent, a curing retarder, a peptizing agent, a process oil, a plasticizer and the like. The mixing amount of these additives is preferably 0.1 to 10 parts by weight relative to 100 parts by weight of the raw material rubber.

The composition for the tread of the vehicle including composition as described above is used to manufacture a tire through known methods.

For example, the rubber composition according to the present invention can be prepared by mixing the above components using a mixer such as a plastomill, a Banbury mixer, a roll or an internal mixer. Specifically, it is preferable to mix components other than the crosslinking agent and the curing accelerator among the above components, and then to add the crosslinking agent and the curing accelerator to the obtained mixed product, followed by further mixing.

The rubber composition prepared by the above method can be used as a material for constituting a tread (and a cap portion including a tread) which comes into contact with the road surface. According to the preparation method, the rubber composition is extruded according to the shape of the tire to be formed (specifically, the shape of the tread) and molded by a conventional method on a tire molding machine to produce an un-crosslinked molded body for tire. A tire tread is produced by heating and pressing the un-crosslinked molded body for tire, for example, in a vulcanizer, and a desired tire can be manufactured by assembling the obtained tire tread and other parts.

The tire thus manufactured is excellent in mechanical properties (elasticity, wear resistance, hardness, tensile strength, modulus, etc.) to be possessed as a tire. Particularly, the manufactured tire has a high gripping property (wet) and thus is excellent in the driving stability of the vehicle, the traction property of the brake, and the relatively low rolling resistance, thereby realizing low fuel cost of the vehicle.

Accordingly, the composition for the tire tread of the present invention is suitable as a composition for obtaining a tread of the tire such as a low fuel cost tire and a high-performance tire.

Hereinafter, preferred embodiments, comparative examples and experimental examples of the present invention will be described. However, the following examples are only a preferred embodiment of the present invention, and the present invention is not limited to the following examples.

Example 1

130 Parts by weight of the raw material rubber consisting of 110 parts by weight of the styrene butadiene rubber (SBR-3323) and 20 parts by weight of the butadiene rubber (BR-01), 5 parts by weight of the methylstyrenated phenol-based resin (PL-2000, Kolon Industries), 5 parts by weight of the hydrogenated hydrocarbon-based resin(SU-625, Kolon Industries), 2 parts by weight of the homogenizing agent (40MS), 3 parts by weight of zinc oxide (ZnO), 25 parts by weight of silica (Z-155), 5 parts by weight of silane coupling agent (X-50S), 25 parts by weight of carbon black (N-330), 2 parts by weight of stearic acid were added to the Banbury mixer, and mixed at 150° C. to release the primary mixing rubber. Then, 2 parts by weight of sulfur, 1.5 parts by weight of curing accelerator (TBBS) and 1 part by weight of curing accelerator (DPG) were put into the primary mixing rubber in the Banbury mixer, cured at 100° C. and then discharged to prepare a rubber specimen.

Example 2

A rubber specimen was prepared in the same manner as in Example 1 above, except that 5 parts by weight of terpene phenol resin (D-1380, Kolon Industries) was added instead of 5 parts by weight of hydrogenated hydrocarbon-based resin.

Example 3

A rubber specimen was prepared in the same manner as in Example 1 above, except that 5 parts by weight of hydrocarbon resin (LP-300, Kolon Industries) was added instead of 5 parts by weight of methylstyrenated phenol-based resin.

Example 4

A rubber specimen was prepared in the same manner as in Example 1 above, except that 5 parts by weight of hydrocarbon-based resin (LP-300, Kolon Industries) and 5 parts by weight of terpene phenol resin (D-1380, Kolon Industries) were added instead of 5 parts by weight of hydrogenated methylstyrenated phenol-based resin and 5 parts by weight of hydrogenated hydrocarbon-based resin.

Comparative Example 1

A rubber specimen was prepared in the same manner as in Example 1 above, except that 10 parts by weight of a process oil (TDAE, H&R) was added instead of 5 parts by weight of hydrogenated methylstyrenated phenol-based resin and 5 parts by weight of hydrogenated hydrocarbon-based resin.

The compositions of Examples 1 to 4 and Comparative Example 1 are summarized in Table 1 below.

Table 1

| | Component (part by weight) | Example 1 | Example 2 | Example 3 | Example 4 | Comparative Example 1 |
|---|---|---|---|---|---|---|
| M/B | SBR-3323 | | | 110 | | |
| | BR-01 | | | 20 | | |
| | 40MS | | | 2 | | |
| | N-330 | | | 25 | | |
| | Z-155 | | | 25 | | |
| | X-50S | | | 5 | | |
| | Stearic acid | | | 2 | | |
| | Zinc oxide | | | 3 | | |

-continued

| Component (part by weight) | | Example 1 | Example 2 | Example 3 | Example 4 | Comparative Example 1 |
|---|---|---|---|---|---|---|
| | PL-2000 | 5 | 5 | 0 | 0 | 0 |
| | SU-625 | 5 | 0 | 5 | 0 | 0 |
| | LP-300 | 0 | 0 | 5 | 5 | 0 |
| | D-1380 | 0 | 5 | 0 | 5 | 0 |
| | TDAE | 0 | 0 | 0 | 0 | 10 |
| F/M | Sulfur | | | 2 | | |
| | TBBS | | | 1.5 | | |
| | DPG | | | 1 | | |

SBR-3323: styrene butadiene rubber,
BR-01: butadiene rubber,
40MS: homogenizing agent,
N-330: carbon black,
Z-155: silica,
X-50S: silane coupling agent,
TBBS: curing accelerator,
DPG: curing accelerator,
PL-2000: methylstyrenated phenol-based resin,
SU-625: hydrocarbon-based resin,
LP-300: hydrogenated hydrocarbon-based resin,
D-1380: terpene phenol resin,
TDAE: process oil Experimental Example 1: Evaluation of Physical Properties of Methylstyrenated Phenol-Based Resin, Hydrocarbon-Based Resin, Hydrogenated Hydrocarbon-Based Resin and Terpene Phenol Resin The physical properties of the methylstyrenated phenol-based resin, the hydrocarbon-based resin, the hydrogenated hydrocarbon-based resin and the terpene phenol resin were measured and the results are shown in Table 2 below.

(1) Measurement of Tg

Tg was measured using a differential scanning calorimeter (DSC).

(2) Measurement of Softening Point

The softening point was measured by a method which measures at a rate of 2° C./min using FT900 and 83HT from Mettler Toledo.

(3) Measurement of Molecular Weight

The resin was dissolved in tetrahydrofuran (THF) at a concentration of 4000 ppm and the molecular weight was measured using a gel permeation chromatography instrument (manufactured by Waters).

TABLE 2

| | Measuring method | Methyl-styrenated phenol-based resin | Hydro-carbon-based resin | Hydrogenated hydrocarbon-based resin | Terpene phenol resin |
|---|---|---|---|---|---|
| Tg (° C.) | DSC | — | — | 63 | 43 |
| Softening point (° C.) | ASTM E 28 | — | — | 125 | 115 |
| Mn (g/mol) | GPC | 234 | 318 | 514 | 684 |
| Mw (g/mol) | | 413 | 526 | 1,084 | 1,190 |
| Mz (g/mol) | | 725 | 824 | 1,865 | 2,197 |

Experimental Example 2: Measurement of Physical Properties of Rubber Specimens of Examples 1 to 4 and Comparative Example 1

Physical properties of each of the rubber specimens prepared in Examples 1 to 4 and Comparative Example 1 were measured and the results are summarized in Table 3 below.

The rheometer was measured according to ASTM D 5289 using MDR 2000E (Monsanto; St. Louis, Mo.).

Specimens with a size of 25±3 $cm^3$ were prepared and mounted in the chamber. Thereafter, the Mooney Viscosity was measured using a Mooney Viscometer MV-2000 (LABTECH) while changing the temperature from 30° C. to 200° C.

Specimens with a thickness of 7 mm were prepared and the shore hardness A was measured using a Shore Hardness Tester (Shore-A type) machine.

Tensile strength, elongation and modulus (100%, 300%) were measured by tensioning at 500 mm/min using U.T.M.-Shimadzu AG-1S (Load cell: PFG-5 kN) measuring instrument according to ASTM D412.

The measurement of viscoelastic physical properties was performed by measuring Tan δ using a dynamic mechanical analysis (DMA) and the Tg value was obtained through the maximum point of Tan δ Peak. At this time, the specification of the instrument and measurement conditions are as follows:

Model: TA-DMA Q800　　　Test Mode: Multi-Frequency-Strain
Type of clamp: Tension-Film　　Frequency: 11 Hz
Preload force: 0.01N　　　Poisson's ratio: 0.44
Measuring range: −50° C. (maintained for 5 minutes) to 75° C.,
Heating rate: 3° C./min The wear (abrasion) resistance was measured according to ASTM D 2228 after fabricating the specimen, and at this time, the obtained numerical value was expressed as a percentage as compared with Comparative Example 1.

TABLE 3

| Physical property | | Example 1 | Example 2 | Example 3 | Example 4 | Comparative Example 1 |
|---|---|---|---|---|---|---|
| Rheometer | Toq (Max.) | 23.2 | 22.9 | 23.2 | 23.1 | 22.5 |
| | Toq (Min.) | 4.3 | 4.3 | 4.3 | 4.3 | 3.8 |
| | T50 | 3:44 | 3:32 | 3:38 | 3:24 | 3:06 |
| | T50 | 6:08 | 5:29 | 5:37 | 5:13 | 6:04 |
| Mooney Viscosity | 100° C. | 65 | 64 | 64 | 63 | 62 |
| | 125° C., T05 | 33:19 | 26:41 | 33:06 | 26:37 | 31:50 |
| | 125° C., T35 | 42:21 | 37:52 | 40:48 | 36:47 | 41:16 |
| UTM | Hardness | 63 | 63 | 64 | 64 | 63 |
| | 100% Modulus | 12 | 12 | 13 | 14 | 13 |
| | 300% Modulus | 41 | 43 | 45 | 45 | 43 |
| | Tensile strength (T.S.) | 152 | 155 | 160 | 157 | 152 |
| | Elongation at break (E.B.) | 760 | 729 | 714 | 762 | 751 |
| DMA | Tg | −14.1 | −13.6 | −16.3 | −13.9 | −14.0 |
| | Tan δ @ 0° C. | 0.441 | 0.485 | 0.406 | 0.453 | 0.370 |
| | | 119% | 131% | 110% | 122% | 100% |
| | Tan δ @ 70° C. | 0.070 | 0.070 | 0.069 | 0.071 | 0.068 |
| | | 97% | 97% | 99% | 96% | 100% |
| Wear | Din (Loss) | 0.315 | 0.321 | 0.285 | 0.303 | 0.315 |
| | | 100% | 98% | 111% | 104% | 100% |

Tan δ @ 0° C.: A value that can predict the wet traction characteristic among the performances of the tire, which means that the higher the value, the better the wet traction characteristic.
Tan δ @ 70° C.: A value that can predict the rolling resistance characteristic among the performances of the tire, which means that the lower the value, the better the rolling resistance characteristic.

As shown in Table 3, when considering the numerical values of Tan δ (0° C.), which is the loss coefficient related to the wet gripping force of the rubber specimens of Examples 1 to 4, it can be seen that the values in Examples 1 to 4 were increased by 19%, 31%, 10% and 22%, respectively, as compared with the values in Comparative Example 1, and that when the resins alternative to a process oil according to the present invention are used, the wet gripping force can be significantly improved.

Also, it can be seen that in the case of the values of Tan δ (70° C.) which is a loss factor related to the rolling resistance, the values in Examples 1 to 4 were increased with the improvement of the wet gripping force, but the increase in the rolling resistance is only 3%, 3%, 1%, and 4%, respectively, as compared with Comparative Example 1, so that the increase in the rolling resistance due to the increase in the gripping force can be effectively reduced.

From these results, it can be concluded that the composition for the tire tread according to the present invention satisfies the effect of increasing the gripping force and minimizing the increase in the rolling resistance, simultaneously while satisfying the basic physical properties required as a tire, namely tensile strength, wear resistance, durability and hardness.

The invention claimed is:

1. A composition for a tire tread, comprising at least one resin selected from the group consisting of a methylstyrenated phenol-based resin, and a hydrocarbon-based resin, and at least one resin selected from the group consisting of a terpene phenol resin and a hydrogenated hydrocarbon-based resin,
   wherein the methylstyrenated phenol-based resin and the hydrocarbon-based resin do not comprise a softening point measured by ASTM E 28, and
   wherein the hydrogenated hydrocarbon-based resin and the terpene phenol resin comprise a softening point measured by ASTM E 28.

2. The composition for the tire tread according to claim 1, wherein the composition for the tire tread does not comprise a process oil.

3. The composition for the tire tread according to claim 1, wherein the weight-average molecular weight of the methylstyrenated phenol-based resin is 200 to 5,000 g/mol; the weight-average molecular weight of the hydrocarbon-based resin is 400 to 5,000 g/mol; the weight-average molecular weight of the hydrogenated hydrocarbon-based resin is 500 to 5,000 g/mol, and its Tg is 30 to 100° C. and its softening point is 100 to 150° C.; and the weight-average molecular weight of the terpene phenol resin is 500 to 5,000 g/mol, and its Tg is 20 to 100° C. and its softening point is 100 to 150° C.

4. The composition for the tire tread according to claim 1, comprising the methylstyrenated phenol-based resin and the terpene phenol resin.

5. The composition for the tire tread according to claim 1, comprising a first resin selected from the group consisting of a methylstyrenated phenol-based resin and a hydrogenated hydrocarbon-based resin, and a second resin selected from the group consisting of a terpene phenol resin and a hydrocarbon-based resin, and the weight ratio of the first resin to the second resin is 30:70 to 70:30.

6. The composition for the tire tread according to claim 5, wherein the first and second resins respectively have a weight ratio of 1 to 10 weight relative to 100 parts by weight of a raw material rubber.

7. The composition for the tire tread according to claim 1, comprising 1 to 10 parts by weight of each of a first resin selected from the group consisting of a methylstyrenated phenol-based resin and a hydrogenated hydrocarbon-based resin, and a second resin selected from the group consisting of a terpene phenol resin and a hydrocarbon-based resin, 1 to 3 parts by weight of a homogenizing agent, 1 to 5 parts by weight of zinc oxide, 10 to 40 parts by weight of silica, 1 to 10 parts by weight of a silane coupling agent, 10 to 40 parts by weight of carbon black, 1 to 3 parts by weight of stearic acid, 1 to 3 parts by weight of sulfur and 1 to 5 parts by weight of a curing accelerator based on 100 to 160 parts by weight of a raw material rubber.

8. The composition for the tire tread according to claim 2, wherein the value of Tan δ at 0° C. of the composition for the tire tread is as high as 10% or more compared to the composition for the tire tread containing the process oil.

9. The composition for the tire tread according to claim 2, wherein the value of Tan δ at 70° C. of the composition for the tire tread is as high as 4% or less compared to the composition for the tire tread containing the process oil.

* * * * *